(12) United States Patent
Zhang et al.

(10) Patent No.: US 6,754,872 B2
(45) Date of Patent: Jun. 22, 2004

(54) METHOD AND APPARATUS FOR REDUCING CHANNEL DISTORTION IN A WIRELESS COMMUNICATIONS NETWORK

(75) Inventors: Yumin Zhang, Ocean, NJ (US); Robert C. Malkemes, Bricktown, NJ (US); Charles Reed, Yardley, PA (US)

(73) Assignee: Sarnoff Corporation, Princeton, NJ (US)

(*) Notice: Subject to any disclaimer, the term of this patent is extended or adjusted under 35 U.S.C. 154(b) by 462 days.

(21) Appl. No.: 09/805,526

(22) Filed: Mar. 13, 2001

(65) Prior Publication Data

US 2001/0047503 A1 Nov. 29, 2001

Related U.S. Application Data

(60) Provisional application No. 60/206,133, filed on May 22, 2000.

(51) Int. Cl.[7] .............................................. H03M 13/03
(52) U.S. Cl. ....................................................... 714/786
(58) Field of Search ................................ 714/786, 784, 714/792, 752, 755; 375/262, 265

(56) References Cited

U.S. PATENT DOCUMENTS

| | | | |
|---|---|---|---|
| 6,088,408 A | 7/2000 | Calderbank et al. | 375/347 |
| 6,115,427 A | 9/2000 | Calderbank et al. | 375/267 |
| 6,501,803 B1 * | 12/2002 | Alamouti et al. | 375/262 |

FOREIGN PATENT DOCUMENTS

GB 1 146 705 A2 * 10/2001 .......... H04L/25/03

OTHER PUBLICATIONS

Naguib et al., a space–time coding modern for high data rate wireless communications, Oct. 1998, IEEE Journal on selected areas in Comm., vol. 16, No. 8, pg. 1459–1478.*
Tarokh et al. "Space–Time Codes for High Data Rate Wirless Communication: Performance Criterion and Code Construction" IEEE Transactions on Information Theory, vol. 44, No. 2, pp. 744–765, Mar. 1998.
Alamouti, Siavash M. "A Simple Transmit Diversity Technique for Wireless Communications" IEEE Journal on Select Areas in Communications, vol. 16, No. 8, pp. 1451–1458, Oct. 1998.

* cited by examiner

*Primary Examiner*—Albert Decady
*Assistant Examiner*—Shelly A Chase
(74) *Attorney, Agent, or Firm*—William J. Burke, Esq.

(57) ABSTRACT

A method and apparatus for reducing channel distortion in a broadband, wireless network comprising a residential communications gateway that accepts all incoming communications signals and securely broadcasts those signals throughout a residence. In one embodiment, the gateway comprises a space time block encoder to reduce the effects of multipath and at least one error correction encoder to provide error correction. The space time block encoder generates at least two space time block coded signals that are transmitted via the wireless network. Each space time block coded signal is transmitted using a different antenna.

19 Claims, 4 Drawing Sheets

FIG. 5 ial patent # METHOD AND APPARATUS FOR REDUCING CHANNEL DISTORTION IN A WIRELESS COMMUNICATIONS NETWORK This application claims benefit of U.S. provisional patent application No. 60/206,133, filed May 22, 2000, and hereby incorporated herein by reference in its entirety.

The invention relates to wireless communications networks and, more particularly, the invention relates to reducing channel distortion in a broadband, wireless communications network.

BACKGROUND OF THE DISCLOSURE

Residences are presently coupled to many sources of audio/visual entertainment, communications, and computing signals, including, computer modems, cable television feeds, satellite television feeds, telephone, over-the-air television and so on. Each of these sources of signals enters a residence and is routed via cables to an associated communications appliance, i.e., the telephone signals are routed through the home on a twisted-pair cable to a telephone, the cable television signals are routed through the home on a coaxial cable to a cable set top box, and so on. As such, a residence has many cables, wires and other communications connections throughout the home. Each time an appliance is to be moved from one location to another, the signal cabling must be rerouted. Such cutting and splicing leads to noisy connections and signal degradation that severely effects the fidelity of the signal.

To remedy this problem, wireless local area networks (LAN) have been developed, for example, in accordance to the Institute of Electrical and Electronic Engineers (IEEE) standard 802.11a. However, most wireless local area networks are subject to channel distortion or multipath caused by noise, doppler shifts, and the like. The multipath results in fading or signal degradation of a transmitted signal. Since such channel distortion adversely affects the performance of the wireless local area networks. Thus, there exists a need in the art to reduce these effects of channel distortion.

SUMMARY OF THE INVENTION

The present invention provides a method and apparatus for reducing channel distortion in a broadband, wireless network comprising a residential communications gateway that accepts all incoming communications signals and securely broadcasts those signals throughout a residence or an enterprise. In one embodiment, the gateway comprises a space time block encoder to reduce the effects of multipath and at least one error correction decoder to provide error correction. The space time block encoder generates at least two space time block coded signals transmitted over the wireless network. Each space time block coded signal is transmitted using a different antenna.

Each communications appliance within a residence or enterprise is outfitted with a receiver that decodes the broadcast signals and couples the signals to the input terminals of the associated communications appliance. The system is completely "plug-and-play" such that a user can quickly and easily utilize the gateway for many communications appliances.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
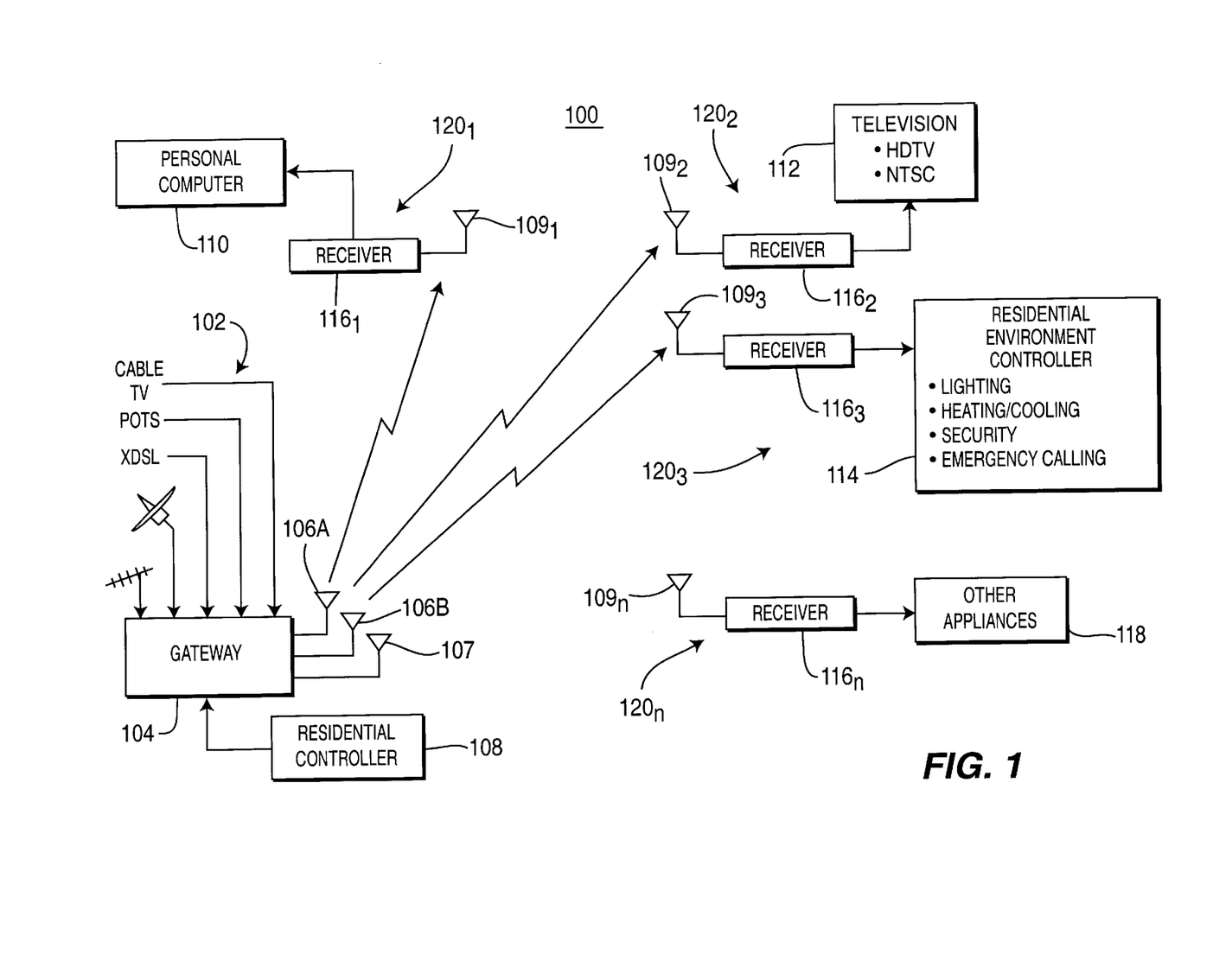
FIG. 1 depicts a block diagram of a wireless network system.

FIG. 1 depicts a block diagram of a broadband, wireless communication system 100 that provides a broadband residential, enterprise or small home office (SOHO) wireless network. The system 100 comprises a gateway 104 and a plurality of receiver nodes $120_n$ (n is an integer). Each receiver node $120_n$ comprises a receiver $116_n$ and a communications appliance, e.g., 110, 112, 114, and 118, coupled to the receiver $116_n$. The gateway 104 receives a plurality of input signals from a plurality of sources 102 including a cable feed, a plain old telephone system (POTS) feed, a satellite television feed, over-the-air television antenna, and the like. The gateway 104 is also optionally coupled to a residential controller 108 that provides the ability to control various environmental aspects of a residence (e.g., lighting, heating, cooling and so on) through a wireless system.

As illustrated, FIG. 1 emphasizes that the entertainment direct to home (DTH), cable, and terrestrial channel tuners are located within the gateway. Channel tuners are no longer associated with the entertainment appliance. Air and physical interface access control, payload mapper and demapper functions are executed within the logic blocks of the gateway. Network control functions also are executed within the logic of the gateway.

Conditional access control for DTH is handled within the traditional decoder module of the A/V (audio/video) appliance so that encrypted entertainment remains encrypted within the in-home network until de-encrypted at the specific subscribing appliance. The traditional interface between the logic block and the appliance is NRSS Level B for information flowing into the appliance and I²C for control going back into the in-home network. Cable pay per view (PPV) is handled within the gateway.

The network itself, at 5.6 GHz, is comprised of three 100 MHz wide bands. These bands are channelized into fifty 6 MHz bands where each channel carries 40 Mbits/secs for a total capacity of 2 Gbits/sec. Control and Internet links can be multiplexed within the 6 MHz wide in-home bands as shown, for example, in Table I:

TABLE I

| Channel Function | Channel Bandwidth | Maximum Available Bands-Adjacent Band Usage |
|---|---|---|
| Delivery of encrypted entertainment from external broadband pipes to appliances at 40 Mbits/sec. | 6 MHZ | 50* |
| In-home multimedia/data channels at 10 Mbits/sec | 6 MHz | 4 per channel** |
| Internet uplinks at 1 Mbit/sec | 6 MHz | 10 per channel** |

*Dedicated non-multiplexed bands.
**Multiplexed within one 6 MHz band using a label protocol.

In a typical home configuration, assuming three DTH picture-in-picture/internet TV sets and two PCs plus DTH and xDSL Internet service subscriptions, the actual channel assignments for this typical network are shown below in Table II:

TABLE II

| Channel Function | Bandwidth Required | 6 MHz Bands Used |
|---|---|---|
| Delivery of encrypted entertainment or internet to TVs (6 @ 40 Mbits/sec) | 6 MHz | 6 |
| PC internet downlinks (2 @ 10 Mbits/sec) | 6 MHz | 1 |
| PC internet uplinks (2 @ 1 Mbits/sec) | 6 MHz | 1 |

Figure 5:
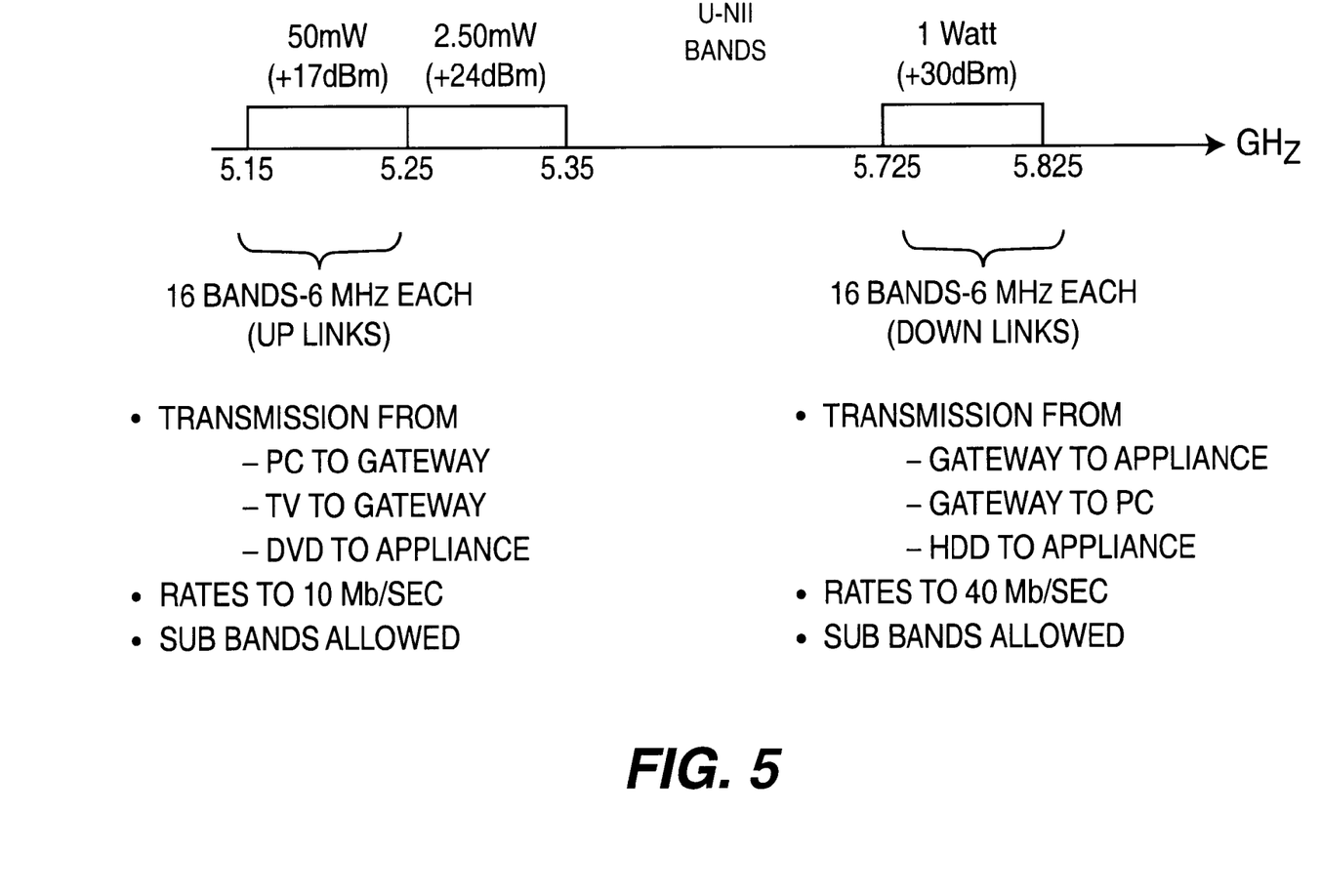
FIG. 5 depicts the frequency allocation for the wireless network system of FIG. 1.

In this example, the total 6 MHz band usage is 8 bands, leaving 42 free bands for near neighbor usage and other 5.6 GHz services. Two 6 MHz bands are dedicated to each TV to support regular high definition television (HDTV) viewing via a DTH service provider plus windows for HDTV PIP (picture in picture) or Internet access, one 6 MHz band is dedicated to downloading the Internet to the two or three PCs and another lightly loaded channel is used for uploading from the PCs to the Internet. A bandwidth utilization example is summarized in FIG. 5.

The modulated signals are transmitted from the gateway 104 to the receivers $116_n$ using at least two antennas 106A and 106B. The transmitted signals are received by the antennas $109_n$ and decoded at various locations throughout the residence. The receivers 116n can be up to 100 meters from the gateway 104. Each receiver $116_n$ receives the transmitted signal using at least one antenna $109_n$ and decodes the relevant signals for the appliance that is attached to the receiver $116_n$. For example, the receiver $116_1$ decodes the signals that are applicable to the personal computer 110, the receiver $116_2$ decodes the signals that are applicable to the television (or home theatre system) 112, and so on. The uplink uses a time division multiple access (TDMA) frame structure having timing synchronized to download timing markers. Uplinks and downlinks are time based synchronized in pairs. As such, the transmissions are packetized and each packet is addressed to a particular receiver node $116_n$. Consequently, the gateway 104 can route signals to any receiver node 120 within the system 100.

To facilitate the high data rates of the system, a 256/64 QAM modulation technology is used in the downlink. The occupied bandwidth is less than 6 MHz allowing a sufficiently large number of useable channels in the higher power portion of the 5 GHz band. With appropriate IF filtering, adjacent channel performance levels in excess of 40 dB can be achieved. A concatenated trellis code and block code structure, e.g., Reed-Solomon code, is used to provide adequate Forward Error Correction or a Turbo Code method may also be employed based upon the outcome of further architectural refinements.

The QPSK modulation technology is used for the uplinks. This occupies a bandwidth of less than 6 MHz with a maximum data rate of 10 Mbits/sec.

One of the most difficult class of problems associated with this 5.6 GHz band is that of channel distortion, e.g., multipath. In this frequency band and in a home or SOHO environment, noise and Doppler shifts may cause a broad range of channel distortion characteristics including flat fading, frequency selective fading and the like. For example, a transmitted signal may become reflected in a communications channel, i.e., when traveling over the wireless network. If, at the receiver antenna $109_n$, the reflected signal is about 180 degrees out of phase with the transmitted line-of-sight signal, the effect of the reflected signal is to cancel or severely degrade the transmitted line-of-sight signal at the receiver $116_n$.

To combat the multipath fading problem, the present invention implements a transmit antenna diversity over the wireless network. Namely, the gateway 104 uses multiple, i.e., at least two, transmit antennas 106A and 106B to transmit space time block coded signals over the wireless network. The space time block coded signal represents a coding of the input signal that is applied to both a space (spatial) domain and a time (temporal) domain. The transmitted signals are received at one or more receive antennas $109_n$ as discussed in S. M. Alamouti, "A Simple Transmit Diversity Technique for Wireless Communications," *IEEE Journal on Select Areas in Communications*, Vol. 16, no. 8, pp. 1451–1457, October 1998, which is herein incorporated by reference. Each receiver $116_n$ uses at least one receive antenna $109_n$ to receive the transmitted signal and uses a space time block decoder to recover the transmitted signals received at the receive antennas $109_n$.

Additionally, transmission over the wireless network is subject to noise, e.g., thermal noise. To counter the effects of noise, the present invention combines space time block coding with other error correction techniques. In one embodiment, the present invention combines space time block coding with Trellis coding and Reed-Solomon coding.

To avoid interference and allow maximum user capacity, a Carrier Sense Multiple Access Collision Detection (CSMA/CD) channel access technique is employed. If contention is sensed, the next best available channel may be utilized by the system. Maximizing the overall available number of channels within the allowable spectrum eases the burden in a multidwelling unit application. A Forward Overhead Control Channel is embedded in the downlink data stream, which advises and controls uplink time slot allocation and channel bandwidth aggregation. Channel access is also controlled through this mechanism. The uplink consists of a TDMA based 10 MB/s QPSK modulated data system in which burst demodulation must be employed to allow multiple users to access the hub unit as required.

Finally, power control of both uplink and downlink traffic channels, can be used to allow maximum utilization of spectrum in high capacity environments and mitigate some of the technical radio design challenges associated with wide dynamic signal range. Because more than one user is multiplexed on a single carrier, the power control algorithm must accommodate the lowest recovered signal strength user as its minimum case.

Figure 2:
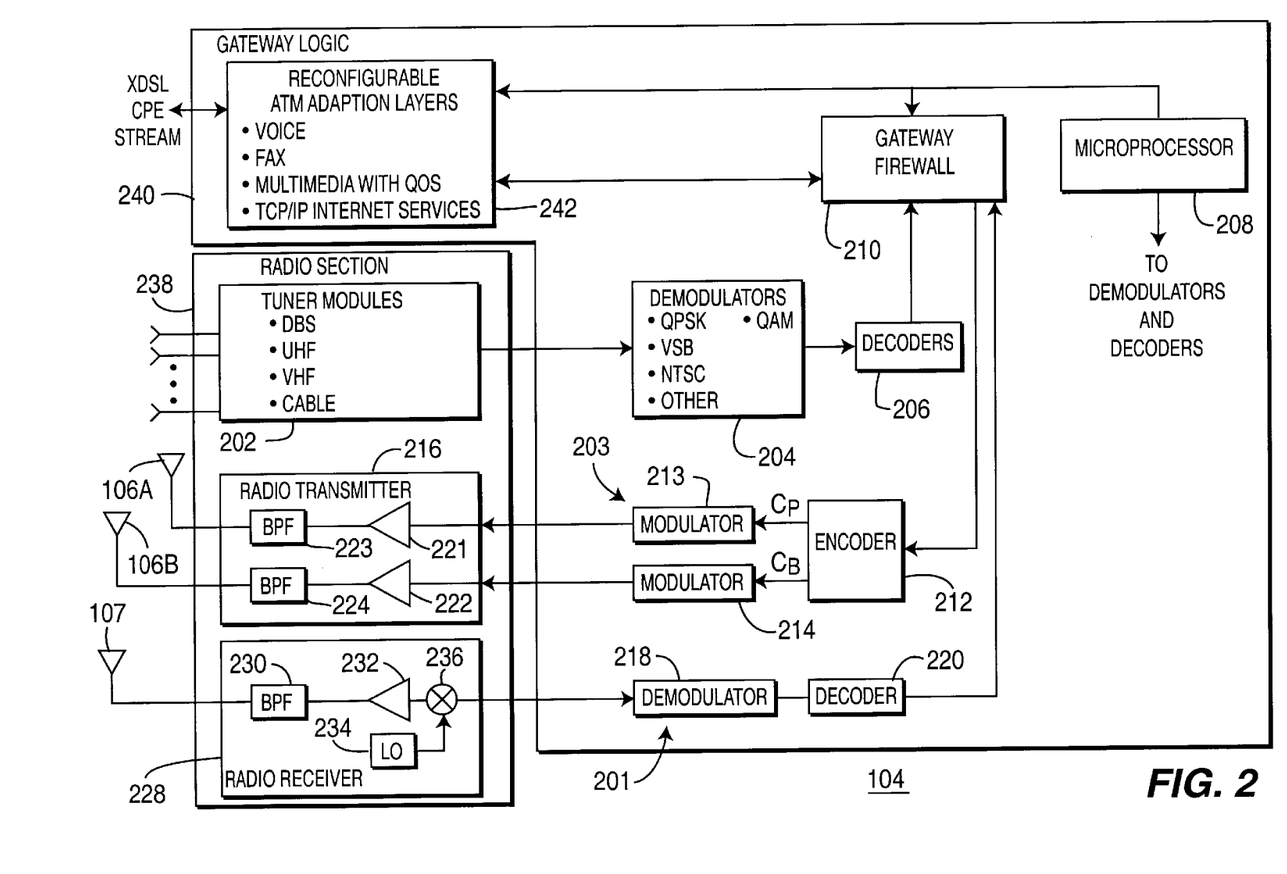
FIG. 2 depicts a block diagram of a network gateway of FIG. 1.

FIG. 2 depicts a detailed block diagram of the gateway 104 comprising a gateway logic 240 and a radio section 238. The radio section 238 comprises a plurality of tuner modules 202 (e.g., direct broadcast satellite (DBS), ultra-high frequency (UHF), very high frequency (VHF), and so on), a radio transmitter and a radio receiver. The gateway logic 240 comprises a plurality of demodulators 204 (e.g., quadrature phase shift keying (QPSK), vestigial side band (VSB), standard television and the like), decoders 206, a reconfigurable ATM adaptation layer 242, a microprocessor 208, a gateway firewall 210, an encoder 212, a modulator 214, a demodulator 218 and a decoder 220. The various sources of RF signals are coupled to the tuner modules 202, which select particular signal channels for reception. Each appliance has a corresponding tuner module 202. The tuner module's filter and down convert each of the selected channels. The channels are selected by a user or users via the back channel communication link from the receivers 116 to the gateway 104. The back channel operation is discussed below. The demodulators 204 demodulate the down converted signals. The decoders 206 then decode the signals including performing error correction to form baseband video. The baseband video is coupled to the gateway interface 210. The tuner modules 202, the demodulators 204, and the decoders 206 are all controlled by the microprocessor 208.

The reconfigurable ATM adaptation layer 242 couples the gateway firewall 210 to an xDSL CPE stream to enable the system to be used to distribute voice, data, fax, multimedia content, and TCP/IP Internet services throughout a residence or enterprise. The content from the xDSL stream can then be displayed by any one of the appliances in the system 100.

The gateway firewall 210 digitizes the decoded signals (if necessary) and provides firewall services. The firewall services ensure that unauthorized users cannot access the gateway from outside the residence without proper authority. Additionally, the gateway firewall 210 provides encryption to ensure that neighboring residences are not capable of viewing each other's programming. The firewall and encryption services are provided by using a well-known protocol such as the media access control (MAC) protocol.

The encrypted baseband video signals are coupled to an encoder, e.g., a forward error correction (FEC) encoder 212. In accordance with the present invention, the FEC encoder 212 encodes the signal to counter effects of channel distortion, e.g., channel fading and thermal noise. Specifically, the exemplary FEC encoder 212 uses a combination of Reed-Solomon coding, Trellis coding and space time block coding. The FEC encoder 212 converts the encrypted baseband video signal into separate branches of space time block encoded signals. In one embodiment, the number of branches is equivalent to the number of antennas 106A and 106B. The FEC encoder 212 is further described with respect to FIG. 3.

The encoded signals are coupled to modulators 213 and 214, where the signal is modulated onto a 5–6 GHz carrier. The modulation is an M-ary quadrature amplitude modulation (QAM). To transmit broadband signals such as HDTV, the modulation is selected to be 256-ary QAM. For lower bandwidth signals, the modulation index can be lowered to, for example, 64.

A radio transmitter 216 amplifies the modulated signal from each modulator 213 and 214, and couples the each signal to an antenna 106. The signal $C_A$ passes through a wide-band amplifier 221 and a bandpass filter 223, while the signal $C_B$ passes through a wide-band amplifier 222 and a bandpass filter 224. The radio transmitter 216, for example, transmits 1 Watt signals in the 5.75–5.85 GHz band (the UNII-band). Each of the transmitted signals carries 20–40 Mbps in a channel bandwidth of approximately 6 MHz. As such, many 6 MHz channels (two or more for each appliance) are transmitted in the UNII-band.

Additional antenna elements could be used with dynamic, beam forming circuitry such that the transmitted signal is "pointed" at the appliance that is to receive the signal being transmitted at any instant in time. Such antenna control provides multipath signal suppression at the receiver plus further enhancements of Quantity of Service (QoS) without the complication of more complex MAC protocols.

The antenna 107 also receives control signals from various appliances within the residence. In one embodiment of the invention, only a single antenna 107 is coupled to the back channel receiver 201 in the gateway 104. Because the back channel data rate is relatively low, the back channel modulation is generally BPSK, QPSK or 4-ary QAM, each of which are relatively easy to receive, even in a noisy environment. As such, diverse antennas are not generally necessary to receive signals in the back channel.

The received signals, known as back-channel signals, are coupled through a bandpass filter 230, amplifier 232, mixer 236 and into a demodulator 218. The radio receiver 228 uses the amplifier 232 to provide amplification, and uses the mixer 236 and local oscillator 234 to perform downconversion. Such amplification and downconversion is performed such that the output of the radio transmitter 216 is an IF signal with a relatively high signal-to-noise ratio (SNR). The back-channel signal is typically in the 5.125–5.325 GHz band (the UNII-band) and transmitted from the network band appliances using 100 mW. The back channel can support 10 Mbits/sec using burst mode QPSK modulation. The demodulator 218 extracts the modulation (a baseband signal) from the carrier signal and couples the baseband signal to the decoder 220. The decoder 220 decodes the baseband signal. The back channel signal carries commands from the network appliances (e.g., 120 of FIG. 1) to instruct the gateway 104 as to what signals to transmit to the appliances. The decoded signals are coupled to the microprocessor 208 for implementation.

Figure 3:
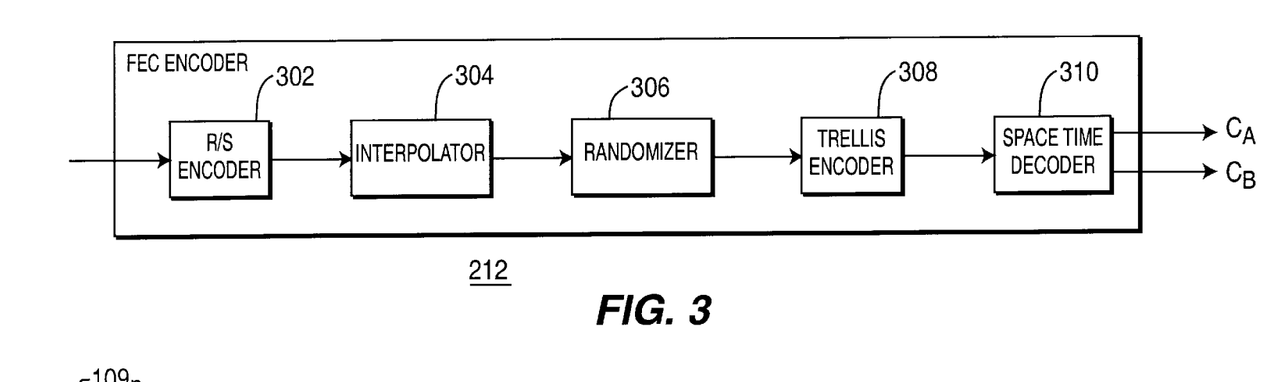
FIG. 3 depicts a block diagram of an encoder of FIG. 2 in accordance with the present invention.

FIG. 3 depicts a block diagram of the FEC encoder 212 in accordance with the present invention. To counter the effects of thermal noise and multipath, e.g., channel fading, the exemplary FEC encoder 212 comprises a Reed-Solomon (R-S) encoder 302, an interleaver 304, a randomizer 306, a Trellis encoder 308, and a space time block encoder 310.

The Reed-Solomon encoder 302 performs a preliminary coding of the baseband signal, e.g., a baseband video signal. The Reed-Solomon encoder 302 generates a block code that allows for decoding of transmitted data despite error bursts. Error recovery of data is possible even if multiple errors occur in a single block. In one embodiment, 6 redundancy or error correction bytes are appended to every 122 bytes of digital television data. If an error occurs, the exact location of the error in the packet can be identified and corrected, and the original data can be reconstructed. As such, the Reed-Solomon encoding allows for the correction of up to 3 byte errors per Reed-Solomon frame.

The interleaver 304 reduces the number of undetected error bursts by spreading the channel errors over time. As the error bursts are considered as random errors, the capability of error correction is enhanced. Specifically, the interleaver 304 reorders the Reed-Solomon block code symbols over several block lengths. This reordering also applies to convolutional codes. The randomizer 306 randomizes the interleaved data to provide a normal Trellis structure to the Trellis encoder 308.

The Trellis encoder 308 performs a convolutional coding on the data, e.g., video, to achieve a better error performance over a single encoder. The Trellis encoder 308 increases error performance by adding redundancy or error correcting bits to an input data sequence. For example, a Trellis encoder 308 having a code rate of 0.5 would generate an 8 output bits for every 4 input bits, i.e., four additional error correcting bits for every four bits of input data.

The encoded data from the Reed-Solomon encoder 302 and the Trellis encoder 308 enables the receiver $116_n$ to perform standard error correction on a signal transmitted over a wireless network. However, noise or Doppler shifts may create serious problems association in transmitting data over the wireless network. These problems are in the form of channel distortion, e.g., multipath. For example, a normally transmitted signal may be reflected 180 degrees out of phase. If the resultant transmitted and reflected signal cancel, resultant signal at the receiver 116 becomes severely faded or cancelled.

The space time block encoder 310 receives the conventional Trellis encoded signal, e.g., video, and illustratively generates two separate and distinct space time block coded signals. These signals are transmitted using the antennas 106A and 106B via the wireless network. The transmission of such spatially and temporally diverse signals enables the receiver $116_n$ to combat multipath fading. Such use of space time block coded signals is well known in the art. However, the present invention also provides additional error correction capability by combining space time block coding with conventional error correction encoding, e.g., use of the Reed-Solomon encoder 302 and the Trellis encoder 308.

Although FIG. 2 illustrates the use of two antennas 106A and 106B to transmit two space time block coded signals, the present invention likewise applies to the transmission of space time block coded signals over more than two antennas. However, such use of additional antennas must also factor the increased cost of antennas 106A and 106B and the increased complexity of the space time block encoder 310.

Figure 4:
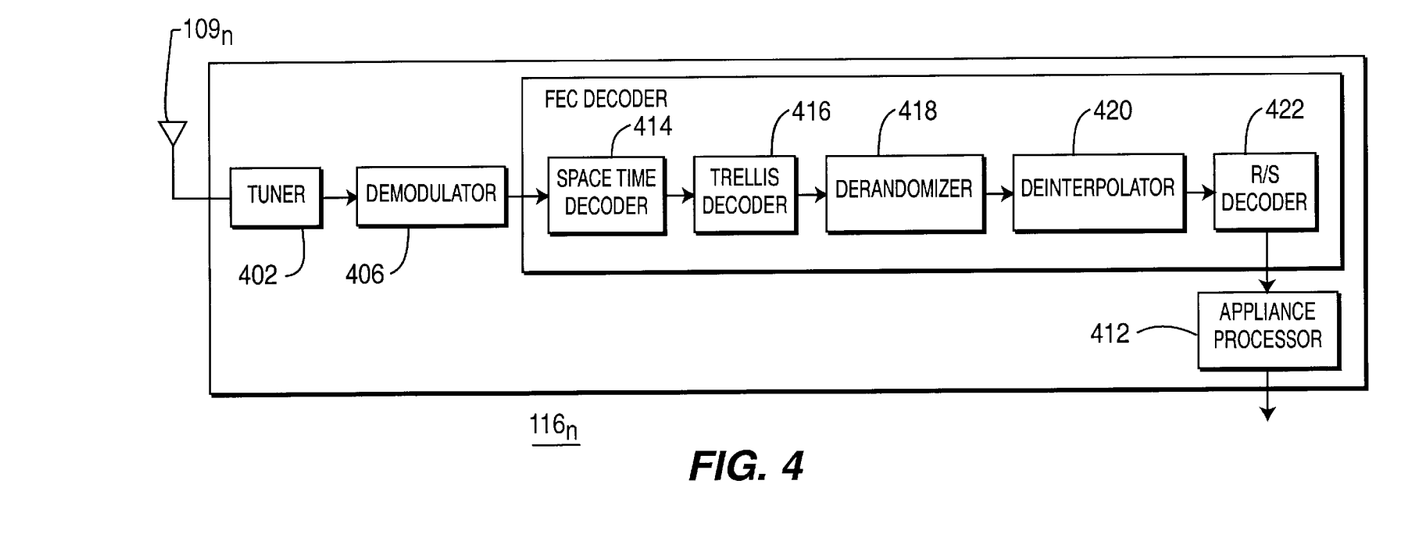
FIG. 4 depicts a block diagram of a receiver of FIG. 1.

FIG. 4 depicts a block diagram of the receiver $116_n$ of FIG. 1. The receiver $116_n$ using one (receive) antenna $109_n$ to receive space time block coded signals $C_A$ and $C_B$ from respective transmit antennas 106A and 106B, and converts the received signals into a baseband signal having a format that is compatible with a network appliance, e.g., a computer 110, a television 112, a residential environment counter 114, and other appliances 118. The received signal may be affected by channel distortion, e.g., thermal noise and multipath. Although the receiver 116 illustratively uses one antenna $109_n$ to receive two or more space time block encoded signals, the receiver 116 may also use multiple receive antennas $109_n$ to better combat multipath facing. However, the use of multiple receive antennas $109_n$ also increases the cost and complexity of the receiver $116_n$.

The receiver $116_n$ comprises tuner 402, demodulator 406, a forward error correction (FEC) decoder 410 and an appliance processor 412. The FEC decoder 410 comprises a space time (code) block decoder 414, a Trellis decoder 416, a derandomizer 418, a deinterleaver 420 and a Reed Solomon decoder 422. The components of the receiver $116_n$ may perform an inverse function to the corresponding encoder 212 and modulators 213 and 214 in the gateway logic 240. Namely, the demodulators 406 and 408 may perform the opposite function of the modulators 213 and 214. Similarly, the FEC decoder 410 and its components may perform opposite functions than that of the FEC encoder 212. Specifically, the space time block decoder 414, the Trellis decoder 416, the derandomizer 418, the deinterleaver 420 and Reed Solomon decoder 422, may perform opposite functions than the respective space time block encoder 310, Trellis encoder 308, randomizer 306, interleaver 304 and Reed Solomon encoder 302.

Each tuner 402 and 404 tunes the received signal using a local oscillator set to a specific channel for television programming or for some other type of data. The demodulators 406 and 408 demodulate the tuned signals containing encoded signals containing $C_A$ and $C_B$ including the reflected portions of those signals. The space time block decoder 414 then generates a space time block decoded signal. By transmitting different signals via diverse antennas, the space time block decoder 414 reduces the effects of multipath, e.g., fading, for signals transmitted from the gateway 104 to the receiver $116_n$. The removal of multipath effects improves the error correction capability of the Trellis decoder 416 and Reed-Solomon decoder 422.

The Trellis decoder 416 decodes the space time block decoded signal into a convolutional code sequence. In one embodiment, the Trellis decoder 416 uses a Viterbi algorithm to implement this decoding. The derandomizer 418 derandomizes the Trellis decoded signal and the deinterleaver 420 orders the derandomized signal over a plurality of block codes.

After the ordering of the Trellis decoded signal, the Reed-Solomon decoder 422 decodes the ordered signal into its original (source) format, e.g., a television signal, digital subscriber line signal, and the like. Such combination of Trellis and Reed-Solomon performs error correction on the received and space time block decoded signal. The signal is then coupled to an appliance processor 412 used for converting the signal into a format suitable for the network appliance, e.g., 110, 112, 114 and 118.

Although various embodiments which incorporate the teachings of the present invention have been shown and described in detail herein, those skilled in the art can readily devise many other varied embodiments that still incorporate these teachings.

What is claimed is:

1. An apparatus for transmitting a source signal via a wireless local area network, said apparatus comprising:
   at least one error correction encoder for encoding said source signal, wherein said at least one error correction encoder comprises a Reed-Solomon encoder and a Trellis encoder, where said Reed-Solomon encoder generates a sequence of block codes and said Trellis encoder generates a sequence of convolutional codes; and
   a space time block encoder for encoding said error corrected signal into at least two space time block coded encoded signals, where each space time block encoded signal is transmitted using a different antenna via said wireless local area network.

2. The apparatus of claim 1 further comprising:
   an interleaver for reordering a plurality of block codes from said Reed-Solomon encoder.

3. The apparatus of claim 1 further comprising:
   a modulator for each encoded signal, for modulating each space time block encoded signal from said space time block encoder; and
   a radio transmitter for each encoded signal, for transmitting each modulated signal using one antenna via said wireless local area network.

4. The apparatus of claim 1 further comprising:
   a receiver for receiving each spatially encoded signal transmitted from said at least two antennas, and for processing each space time block coded signal to form said source signal that is compatible with a network appliance.

5. An apparatus for transmitting a source signal via a wireless local area network, said apparatus comprising:
   at least one error correction encoder for encoding said source signal, wherein said at least one error correction encoder comprises a Reed-Solomon encoder and a Trellis encoder, where said Reed-Solomon encoder generates a sequence of block codes and said Trellis encoder generates a sequence of convolutional codes; and
   a space time block encoder for encoding said error corrected signal into at least two space time block coded encoded signals, where each space time block encoded signal is transmitted using a different antenna via said wireless local area network
   an interleaver for reordering a plurality of block codes from said Reed-Solomon encoder; and
   a randomizer for randomizing the reordered plurality of block codes.

6. An apparatus for transmitting a source signal via a wireless local area network, said apparatus comprising:
   at least one error correction encoder for encoding said source signal;
   a space time block encoder for encoding said error corrected signal into at least two space time block coded encoded signals, where each space time block encoded signal is transmitted using a different antenna via said wireless local area network;
   a modulator for each encoded signal, for modulating each space time block encoded signal from said space time block encoder; and
   a radio transmitter for each encoded signal, for transmitting each modulated signal using one antenna via said wireless local area network, wherein said radio transmitter comprises:
an amplifier for amplifying the modulated signal; and
a bandpass filter for filtering the amplified signal.

7. An apparatus for transmitting a source signal via a wireless local area network, said apparatus comprising:
at least one error correction encoder for encoding said source signal; and
a space time block encoder for encoding said error corrected signal into at least two space time block coded encoded signals, where each space time block encoded signal is transmitted using a different antenna via said wireless local area network; and
a receiver for receiving each spatially encoded signal transmitted from said at least two antennas, and for processing each space time block coded signal to form said source signal that is compatible with a network appliance, wherein said receiver comprises:
a tuner for tuning each received signal;
a demodulator for demodulating each tuned signal;
a space time block decoder for decoding the demodulated signals into a space time block decoded signal; and
at least one error correction decoder for decoding said space time block decoded signal into said source signal.

8. The apparatus of claim 7 wherein said at least one error correction decoder comprises a Trellis decoder and a Reed-Solomon decoder.

9. The apparatus of claim 8 further comprising a derandomizer and a deinterleaver, where said derandomizer derandomizes the Trellis decoded signal and said deinterleaver orders the derandomized signal.

10. The apparatus of claim 8 further comprising:
an appliance processor for converting said decoded signal into said source signal that is compatible with said network appliance.

11. The apparatus of claim 8 wherein said Trellis decoder uses a Viterbi algorithm.

12. An apparatus for providing a wireless local area network, said apparatus comprising:
a gateway for receiving a source signal from a plurality of signals, selecting a particular signal from said plurality of signals, where said gateway comprises at least one error correction encoder for encoding said selected signal, and a space time block encoder for encoding said error corrected signal into at least two spatially encoded signals, where each spatially encoded signal is transmitted using a different antenna via said wireless local area network, wherein said at least one error correction encoder comprises a Reed-Solomon encoder and a Trellis encoder, where said Reed-Solomon encoder generates a sequence of block codes and said Trellis encoder generates a sequence of convolutional codes; and
a receiver for receiving the transmitted signals, and converting the received signal into said source signal that is compatible with a network appliance.

13. The apparatus of claim 12 wherein said receiver comprises:
a space time block decoder for decoding said received signals into a space time block decoded signal; and
at least one error correction decoder for decoding said space time block decoded signal into said source signal.

14. The apparatus of claim 12 wherein said plurality of signals comprise at least one signal from a group comprising analog cable television, digital cable television, plain old telephone signals, digital subscriber line signals, satellite television signals, over-the-air television signals and any combination thereof.

15. An apparatus for providing a wireless local area network, said apparatus comprising:
a gateway for receiving a source signal from a plurality of signals, selecting a particular signal from said plurality of signals, where said gateway comprises at least one error correction encoder for encoding said selected signal, and a space time block encoder for encoding said error corrected signal into at least two spatially encoded signals, where each spatially encoded signal is transmitted using a different antenna via said wireless local area network;
a receiver for receiving the transmitted signals, and converting the received signal into said source signal that is compatible with a network appliance; and
a back channel transmitter for transmitting a channel selection signal from said network appliance to said gateway.

16. An apparatus for providing a wireless local area network, said apparatus comprising:
a gateway for receiving a source signal from a plurality of signals, selecting a particular signal from said plurality of signals, where said gateway comprises at least one error correction encoder for encoding said selected signal, and a space time block encoder for encoding said error corrected signal into at least two spatially encoded signals, where each spatially encoded signal is transmitted using a different antenna via said wireless local area network wherein said gateway comprises a radio transmitter for transmitting the selected signals and for receiving a control signal from said network appliance; and
a receiver for receiving the transmitted signals, and converting the received signal into said source signal that is compatible with a network appliance.

17. A method for transmitting a source signal via a wireless local area network, said method comprising:
encoding said source signal using at least one form of error correction;
encoding said error corrected signal, using space time block coding, into at least two space time block coded signals, wherein said error correction encoding comprises:
encoding said source signal into a sequence of block codes using Reed-Solomon encoding; and
encoding the block code into a sequence of convolutional codes using Trellis encoding; and
transmitting said at least two space time block coded signals using at least two antennas via said wireless local area network, where each space time block coded signal is transmitted using a different antenna.

18. A method for providing a wireless local area network, said method comprising:
receiving a channel selection signal via a back channel from a network appliance; selecting a channel from a plurality of channels in response to the channel selection signal;
demodulating and decoding a source signal from the selected channel;

encoding said source signal using at least one form of error correction;

encoding said error corrected signal, using space time block coding, into at least two space time block coded signals; and transmitting said at least two space time block coded signals via at least two antennas via said wireless local area network, where each space time block coded signal is transmitted using a different antenna.

19. The method of claim 18 further comprising:

receiving each transmitted signal and any reflection of each transmitted signal;

decoding the received signals into a space time block decoded signal;

decoding the space time block decoded signal into said source signal; and processing said source signal for use with a network appliance.

* * * * *